Aug. 1, 1967  J. S. PAWLINA ET AL  3,333,661
FORWARD-REVERSE CLUTCH
Filed Feb. 12, 1965  2 Sheets-Sheet 1

INVENTORS
JULIAN S. PAWLINA
& JANIS TENISONS
BY
ATTORNEYS

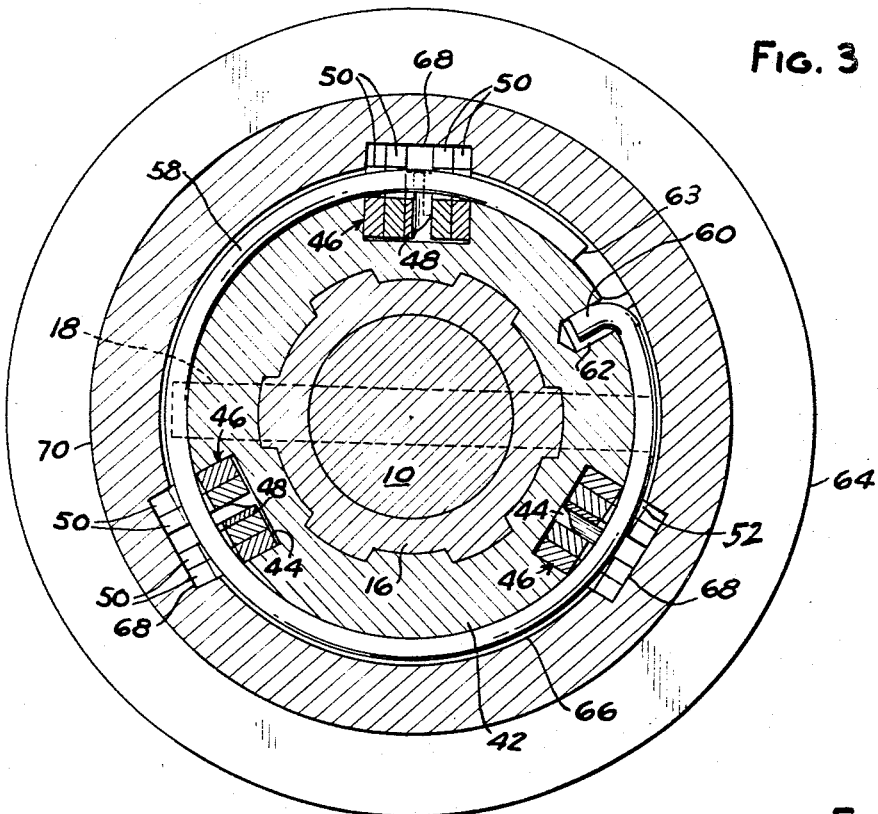
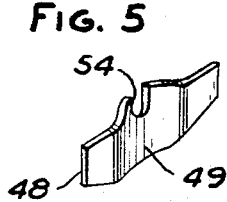
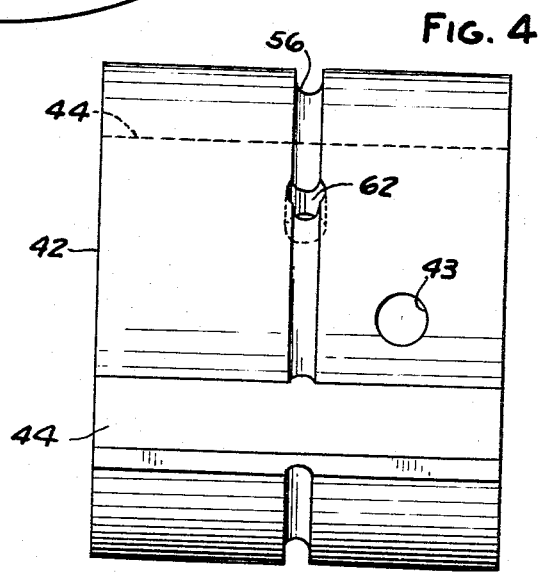
INVENTORS
JULIAN S. PAWLINA
& JANIS TENISONS
BY
Barnes, Kisselle, Raisch & Choate
ATTORNEYS

United States Patent Office 3,333,661
Patented Aug. 1, 1967

3,333,661
FORWARD-REVERSE CLUTCH
Julian S. Pawlina and Janis Tenisons, Elkhart, Ind., assignors to Tecumseh Products Company, Tecumseh, Mich., a corporation of Michigan
Filed Feb. 12, 1965, Ser. No. 432,104
4 Claims. (Cl. 192—48)

This invention relates to clutches and more particularly to improvements in forward-reverse friction clutches of the type shown in the Adamson United States Patent 2,279,700.

An object of the present invention is to provide an improved clutch of the aforementioned type which is less expensive to manufacture and more convenient to service.

Other objects, features and advantages of the present invention will become apparent from the following descripiton taken in conjunction with the accompanying drawings wherein:

FIG. 3 is a sectional view taken on the line 3—3 of FIG. 1.

FIG. 4 is an elevational view of a central sleeve of the clutch shown separately therefrom.

FIG. 5 is a perspective view of a spring washer component of the lever assembly of the clutch of the present invention.

Figure 1:
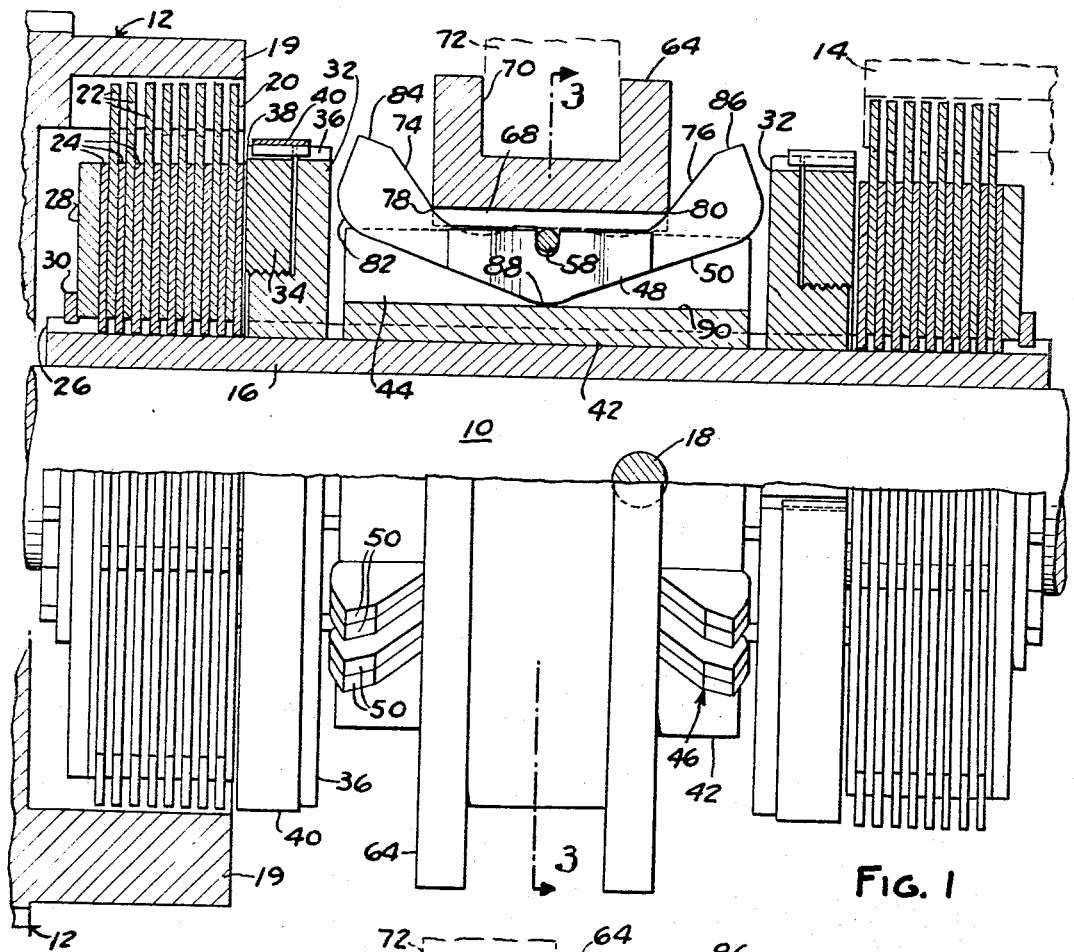
FIG. 1 is an elevational view of an improved clutch construction of the present invention showing a dual arrangement of clutches which may be used to effect changes in speed or a reversal in rotation of a driven member, both clutches being shown in their disengaged positions and the upper half of the clutch being shown in longitudinal center section.

The dual clutch illustrated in the drawings is similar to and is an improvement over that disclosed in the aforementioned United States Patent No. 2,279,700 and may be used as a forward-reverse friction disc clutch in the transmission of a motor driven hand guided tractor as shown in United States patent to Weiss, 2,105,680. Referring to FIG. 1 the clutch assembly is supported on a shaft 10 constituting one of the rotary parts of a transmission which, for purposes of illustration, constitutes the driven member of the clutch construction. Shaft 10 carries a pair of clutch gears 12 and 14 journaled thereon for rotation relative thereto, gear 14 being shown in phantom since the same is identical to gear 12. Gears 12 and 14 are continuously rotatably driven in opposite directions by the drive shaft and associated gears when the clutch is used as a forward-reverse clutch in the transmission.

A clutch hub 16 is secured to shaft 10 by a pin 18 (FIGS. 1 and 3) and adjacent the ends of hub 16 are mounted identical friction disc clutches. Accordingly but one clutch will be described, reference hereinafter being made to the left hand clutch as viewed in FIG. 1.

Gear 12 has an axially extending sleeve portion 19 with a plurality of axially extending grooves 20 in its inner periphery each of which receives therein the keying projection of a plurality of driving friction discs 22. Discs 22 thus are keyed for rotation with gear 12 but are centrally apertured for face rotation and axial movement on hub 16. A plurality of driven friction discs 24 are interleaved with discs 22 and are keyed to the splines 26 of hub 16 to impart rotation thereto, discs 24 likewise being axially movable on hub 16. Movement of the discs axially to the left as viewed in FIG. 1 is limited by a backing plate 28 which is restrained by a snap ring 30 mounted in an annular recess in hub 16. A pressure ring 32 is splined on hub 16 for axial sliding movement adjacent the innermost disc of the set. Ring 32 threadably carries an adjusting ring 34 which may be rotated to move it axially relative to the pressure ring to compensate for frictional wear of the discs and ring. The respective peripheries of rings 32 and 34 are notched as at 36 and 38 respectively, and a split clamping ring 40 encircles both rings 32 and 34 and has its inturned ends received in the notches to lock ring 34 relative to ring 32.

Centrally disposed on hub 16 between rings 32 of the respective clutches is a sleeve 42 which has a splined connection with hub 16 (FIG. 3) and which also has a diametrical bore 43 (FIG. 4) for receiving the opposite ends of pin 18 to thereby anchor sleeve 42 to hub 16 and shaft 10. Sleeve 42 has three axially extending grooves 44 spaced 120° apart in its outer periphery. Each groove 44 receives a generally V-shaped laminated lever assembly 46 preferably consisting of four sheet metal stampings 50 which in their assembled position are separated into two side-by-side pairs by a spring washer 48. As best seen in FIG. 5, washer 48 comprises a generally flat sheet metal stamping bowed in the middle to form a central hump 49, washer 48 thus being adapted to serve as a spring spacer in lever assembly 46. Each lever lamina 50 has a central notch 52 in its upper edge, and washer 48 is likewise notched at 54. When washer 48 and lamina 50 are assembled in sleeve groove 44, their notches 52 and 54 register with a circumferential center groove 56 (FIG. 4) formed in the outer circumference of sleeve 42. A parted resilient retaining ring 58, preferably of spring wire having a free inside diameter smaller than the root diameter of groove 56, is expanded and slipped endwise over sleeve 42 and lever assemblies 46 disposed in grooves 44 and then allowed to snap into groove 56 so that ring 58 extends through notches 52 and 54 to thereby detachably hold lever assemblies 46 and sleeve 42 in assembled relation. Ring 58 also functions to restrain axial movement of each lever assembly 46 as it pivots or rocks on its rounded vertex 88, the vertex 88 sliding against the bottom 90 of groove 44 to accommodate this rocking movement about ring 58 as a center. Ring 58 has an inturned end 60 (FIG. 3) which projects into a radial hole 62 disposed in sleeve 42 between grooves 44 to prevent the gap defined between end 60 and the other end 63 of ring 58 (FIG. 3) from rotating into registry with levers 46.

Figure 2:
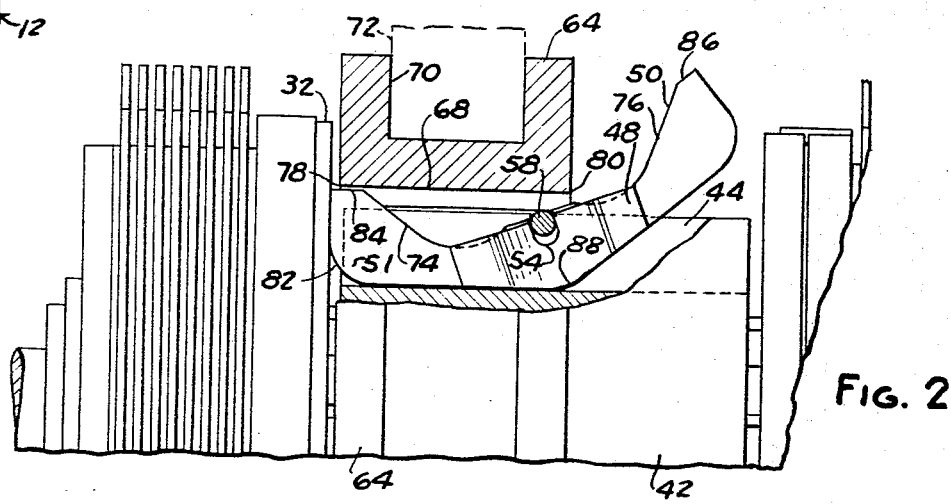
FIG. 2 is a fragmentary elevational view taken partially in longitudinal center section of a portion of the clutch structure of FIG. 1 illustrating the left hand clutch in its engaged position and the right hand clutch in its disengaged position.

A shift ring or collar 64 (FIGS. 1 and 3) has a center bore 66 dimensioned so that ring 64 can be slipped endwise onto the sleeve 42 with a sliding fit. Ring 64 has three axially extending grooves 68 in its inner periphery which register with lever assemblies 46 to permit the ring to be slipped endwise over lever assemblies 46 when they are rocked to their FIG. 2 position wherein all of the arms 51 on one side have been retracted into the respective grooves 44 of sleeve 42 (FIG. 2). Ring 64 has a circumferentially extending center groove 70 in its outer periphery which slidably receive a conventional shift yoke 72 (shown in broken lines in FIGS. 1 and 2) which is adapted for operable connection to the clutch control mechanism (not shown) in a known manner. The outer edges of 74 and 76 of lamina 50 are suitably contoured to slidably contact the opposite end edges 78 and 80 respectively of sleeve groove 68 when ring 64 is in the vicinity of its center, neutral position (FIG. 1).

In operation, movement of yoke 72 parallel to the axis of the clutch by the operation of the clutch control mechanism in the usual manner shifts ring 64 axially relative to sleeve 42 and to lever assemblies 46. Assuming that ring 64 is moved from the neutral position of FIG. 1 to the position of FIG. 2 to engage the left hand clutch, sliding contact of edge 78 of the ring against edges 74 of laminae 50 cams their left hand arms 51 radially inwardly of sleeve 42 while edges 76 slide up along edge 80 and allow the right hand arms to rock outwardly. As arms 51 are cammed inwardly, their rounded corner edges 82 slidably contact the adjacent face of the left hand plate 32 to thereby force plate 34 axially against the adjacent left hand set of clutch discs to thereby clamp the driving and driven discs of this set frictionally together. This frictionally couples gear 12 to shaft 10 to thereby rotatably drive shaft 10 in the direction of rotation of gear 12. To reverse the rotation of shaft 10, ring 64 is shifted to the right (as viewed in FIGS. 1 and 2) to its other extreme axial position (not shown), thereby rocking lever assemblies 46 clockwise (as viewed in FIGS. 1 and 2) into engagement with the right hand plate 32 to exert pressure on the right clutch discs, thereby frictionally coupling shaft 10 to gear 14 and disengaging it from gear 12. The central or middle position of ring 64 (FIG. 1) provides a positive neutral setting. The terminal ends 84 and 86 of the outer edges 78 and 80 of each lamina 50 (FIGS. 1 and 2) are suitably oriented such that they extend parallel to the axis of the clutch when the associated arm of lamina 50 is rocked to its bottomed position in sleeve grooves 44. This feature eliminates any axial reaction force from being transmitted from the lever to ring 64 which otherwise would tend to shift the ring back toward neutral position.

From the foregoing description, it will now be apparent that the present invention provides an improved lever, sleeve and shift ring construction in a dual friction clutch. By providing a laminated lever assembly 46, the individual lamina 50 thereof may be made thin enough to permit the same to be inexpensively manufactured by stamping them from sheet metal. Yet when assembled together the individual lamina 50 provide a lever assembly 46 having high strength and wear resistance. The spacer spring 48 interposed between the center laminae 50 of each lever assembly 46 insures that the lever assemblies fit snugly in the associated sleeve grooves 44, thereby eliminating the necessity for maintaining close tolerances between the total thickness of the laminated lever and the corresponding dimension of the groove.

In accordance with another feature of the present invention, the three lever assemblies 46 are all maintained in assembled relation in their respective grooves by the single resilient retaining ring 58. This reduces machining costs by eliminating the necessity for drilling a plurality of pin holes for the separate pins employed in prior art devices for retaining each lever assembly in its respective slot.

Ring 58 also cooperates in a novel manner with a rounded vertex 88 (FIG. 1) of each lamina 50 which rides upon the bottom wall 90 of groove 44 to provide the fulcrum for the levers when they are rocked by ring 64. Hence there is substantially no radial loading placed upon the retaining ring 58 and therefore it may be made of light gauge spring wire. This manner of fulcruming the levers for sliding movement on the bottom of the grooves also eliminates the need for a center hole in the lever for receiving the usual pivot pin of the prior art, thereby contributing to greater strength in the levers.

In addition to reducing machining and parts costs, the lever retention arrangement of the present invention reduces the time and hence cost of assembling the clutch and also facilitates servicing since the levers can be easily installed and replaced due to the manner in which they are detachably retained by resilient ring 58.

We claim:

1. In a friction clutch having interleaved sets of friction discs respectively connectable to input and output rotary parts and axially movable relative to one another for frictional torque transmitting interengagement and clamping means for urging said discs into said engagement, the combination therewith of a coaxial annular member having a peripheral surface disposed adjacent said clamping means with a plurality of circumferentially spaced axially extending grooves therein each defined by a bottom wall and a pair of side walls, a plurality of lever means individually received in said grooves each having a generally V-shaped surface with the vertex thereof slidably abutting said bottom wall of the associated groove, said lever means having a notch in a second surface thereof generally opposite said vertex of said V-shaped surface, a retaining ring extending circumferentially of said annular member adjacent said peripheral surface thereof and through said notches radially retaining said lever means in said grooves, means restraining said ring against axial movement relative to said annular member whereby said ring restrains axial movement of said lever means relative to said annular member and serves as a fulcrum for pivotally supporting said lever means in the associated grooves, and means operably engaging said second surfaces of said lever means to pivot said lever means in said grooves in response to movement of said last-mentioned means axially of said annular member, said lever means being adapted to bear at an end thereof remote from said notch against said clamping means when said one end is pivoted toward said bottom wall of said groove by axial movement of said last-mentioned means toward said clamping means.

2. The combination set forth in claim 1 wherein said lever means in each of said grooves comprises a plurality of identical metal stampings disposed in said groove and a spring washer disposed between and biasing said stampings toward the respectively adjacent groove side walls.

3. The combination set forth in claim 1 wherein said ring restraining means comprises a circumferentially extending radial groove in said peripheral surface of said annular member receiving said ring therein, said ring comprising a parted resilient wire having one end extending radially thereof said annular member having a radially extending recess opening at said circumferentially extending groove, said end of said ring being received in said recess to thereby anchor said ring against rotation on said annular member.

4. In a twin disc clutch having hub means, sets of clutching discs spaced axially apart on said hub means, clamping plates axially movable for frictionally interengaging said discs and clutch actuating means mounted on said hub means intermediate said plates for selective actuation of either of said disc sets via the respectively adjacent plate, the improvement wherein said clutch actuating means comprises a plurality of circumferentially spaced axially extending grooves in the outer periphery of said hub means each defined by a bottom wall and circumferentially spaced side walls, lever means in each of said grooves having a generally V-shaped surface with the vertex of said surface slidably abutting said bottom wall of said groove, said lever means each having a notch in a second surface thereof generally opposite said vertex, a retaining ring encircling said hub means and extending through said notches of said lever means, means restraining said ring against movement axially of said hub means and a collar encircling said hub means and shiftable axially of said hub means to slidably engage said second surfaces of said lever means and thereby pivot the same in said grooves about a fulcrum point defined by the engagement of said retaining ring with said lever means in said notches thereof whereby said lever means are selectively engageable with said clamping plates to frictionally interengage the associated disc set.

References Cited

UNITED STATES PATENTS

| | | | |
|---|---|---|---|
| 2,376,135 | 5/1945 | Gerst | 192—43 |
| 2,380,571 | 7/1945 | Barron | 192—93 X |
| 3,189,147 | 6/1965 | Holdeman | 192—48 |

FOREIGN PATENTS 1,290,069  2/1962  France.

FRED C. MATTERN, JR., *Primary Examiner.*

DAVID J. WILLIAMOWSKY *Examiner.*

C. J. HUSAR, *Assistant Examiner.*